(12) United States Patent
Daunt et al.

(10) Patent No.: US 9,172,472 B2
(45) Date of Patent: Oct. 27, 2015

(54) METHOD FOR MODULATING A CARRIER LIGHT WAVE

(71) Applicant: FINISAR SWEDEN AB, Jarfalla (SE)

(72) Inventors: Christopher Daunt, Stockholm (SE); Peter Szabo, Taby (SE); Jan-Olof Wesstrom, Stockholm (SE); Urban Eriksson, Bromma (SE)

(73) Assignee: FINISAR SWEDEN AB, Jarfalla (SE)

( * ) Notice: Subject to any disclaimer, the term of this patent is extended or adjusted under 35 U.S.C. 154(b) by 42 days.

(21) Appl. No.: 14/017,590

(22) Filed: Sep. 4, 2013

(65) Prior Publication Data

US 2015/0063827 A1 Mar. 5, 2015

(51) Int. Cl.
*H04B 10/556* (2013.01)
(52) U.S. Cl.
CPC .................................. *H04B 10/5561* (2013.01)
(58) Field of Classification Search
CPC .......... H04B 10/5051–10/5053; H04B 10/516; H04B 10/54–10/5561
USPC .......... 398/65, 183, 188; 385/3; 359/279, 284
See application file for complete search history.

(56) References Cited

U.S. PATENT DOCUMENTS

| 2008/0181332 A1* | 7/2008 | Tian et al. ...................... 375/308 |
| 2009/0324247 A1* | 12/2009 | Kikuchi ........................ 398/159 |
| 2010/0061738 A1* | 3/2010 | Giorgi et al. .................. 398/149 |
| 2012/0251032 A1* | 10/2012 | Kato .................................. 385/3 |
| 2015/0063822 A1* | 3/2015 | Noguchi ....................... 398/140 |

FOREIGN PATENT DOCUMENTS

WO 2011022308 2/2011

OTHER PUBLICATIONS

Yossef Ehrlichman, et. al., "A Method for Generating Arbitrary Optical Signal Constellations Using Direct Digital Drive", Journal of Light Wave Technology, vol. 29, No. 17, Sep. 1, 2011.
Hyeon Yeong Choi, et. al., "A New Multi-Purpose Optical Transmitter for Higher-Order QAM Generation", OFC/NFOEC Technical Digest, 2013 (Abstract Only).

* cited by examiner

*Primary Examiner* — David Payne
*Assistant Examiner* — Casey Kretzer
(74) *Attorney, Agent, or Firm* — Young & Thompson (57) ABSTRACT

Method for modulating a carrier light wave to achieve, a modulated light wave which carries information by symbols selected from a set of at least two different symbols. The light led through each path is phase-shifted by a respective total variable part phase shift, which for each path is the sum of at least three respective variable part phase shifts. Each variable part phase shift for each modulation state assumes one of two respective predetermined values, and each symbol is modulated using a respective combination of two such total variable part phase shifts. The modulation performed by the two paths is a PSK (Phase Shift Keying) modulation scheme, the group of symbols includes $2^N$ unique symbols, the light led through each respective path is phase shifted using $2^N-1$ variable part phase shifts, and the respective difference between the respective predetermined values is the same for all variable part phase shifts.

18 Claims, 10 Drawing Sheets

METHOD FOR MODULATING A CARRIER LIGHT WAVE

FIELD OF THE INVENTION

The present invention relates to a method for modulating a carrier light wave, more specifically for achieving a modulated light wave carrying information about one or several symbols selected among a predetermined set of symbols.

In particular, the present invention relates to modulating a carrier light wave using phase modulation and/or amplitude modulation.

The invention also relates to a system using such method.

BACKGROUND OF THE INVENTION

In many applications, in particular for high speed optical communication systems, a modulated light wave is used to carry digital information from a sender to a receiver. In many such systems, the modulation may be phase and/or amplitude modulation. Examples include phase shift keying modulation techniques, such as Binary Phase Shift Keying (BPSK) and Quadrature Phase Shift Keying (QPSK), and Quadrature Amplitude Modulation (QAM) techniques, such as QAM8, QAM16 and QAM64.

In order to achieve such modulation of a carrier light wave, it is known to split the carrier light wave using a splitter, and to recombine the carrier light wave in a combiner after a relative phase shift of the different light paths between the splitter and combiner. The phase shift can for instance be achieved using electrodes attached to each path, to each of which electrodes a variable electrical signal can be applied so that the refractive index of the path wave guide material changes, forming a Mach-Zehnder interferometer. Such variable phase shift can be combined with a predetermined fixed phase shift for each waveguide. This way, each symbol can be modulated as a unique combination of total phase shifts along each path. A modulator in which a first parallel-coupled Mach-Zehnder modulator (MZM) controls the imaginary part of the electromagnetic field (Q value) and a second parallel-coupled MZM controls the corresponding real part (I value) is called an IQ modulator.

WO 2011022308 A2 discloses using an MZM, yielding two paths, or two parallel-coupled child MZMs on one respective path of a parent MZM, yielding in total four paths, with variable-current electrodes on each path, for such modulation.

Known two-armed structures offers limited possibilities to achieve advanced modulation formats, such as higher-order QAM formats, without using complicated drive electronics. In many cases, it is preferred to use electrode voltages that have predetermined, fixed values, preferably at a few, most preferably only two, different voltage values. This makes the control electronics fast and simple, which is preferable for high bitrates.

Yossef Ehrlichman, et. al., "A Method for Generating Arbitrary Optical Signal Constellations Using Direct Digital Drive", JOURNAL OF LIGHT WAVE TECHNOLOGY, VOL. 29, NO. 17, Sep. 1, 2011, discloses a method for creating various such symbols using a two-armed structure.

Hyeon Yeong Choi, et. al., "A New Multi-Purpose Optical Transmitter for Higher-Order QAM Generation", OFC/NFOEC Technical Digest, 2013, discloses a method for creating arbitrary modulated symbols using a first and a second four-arm MZM aggregate.

These methods require complicated drive electronics, making them expensive and less suitable for high-frequency applications.

Furthermore, WO 2011022308 A2, above, discloses the use of multiple, individually controlled electrode segments for each optical path in the modulator. The purpose of this is to mitigate the nonlinearity of the relation between the electrode voltage and the resulting refractive index of the waveguide material. The segments are controlled individually to select the total phase modulation applied to each path.

A conventional IQ modulator is associated with low output noise, since total or partial anti-symmetric voltage noise results in the reduction of optical phase noise. However, it is a complex structure, requiring many electrical contact points and relatively large build dimensions.

Hence, it would be desirable to achieve an optical modulator capable of modulating complex symbols, such as according to various PSK and QAM modulation scheme versions, which is less complex than a full IQ modulator or the corresponding, and which does not add significant noise as compared to the conventional IQ modulator. Furthermore, it would be desired to achieve such a modulator which can be driven by a driver with only simple control logic. Preferably, such a modulator would also have high power transmission.

In particular, it would be desirable to achieve such a modulator which is suitable for use in mixed material systems, such as systems using silicon for the drive electronics and active bandgap III-V materials such as indium phosphide or gallium arsenide for the optical waveguides.

The present invention solves the above described problems.

SUMMARY OF THE INVENTION

Hence, the invention relates to a method for modulating a carrier light wave so that a modulated light wave is achieved, which modulated light wave carries information by means of symbols selected from a set of at least two different symbols, wherein the carrier light wave is led through a modulating interferometer comprising respective first and second parallel-coupled waveguiding modulation paths, wherein the carrier light wave is first split, subsequently led through said two paths and then recombined, wherein for modulating each respective symbol the respective light led through each respective path, between the said split and the said recombining, is phase shifted by a respective total variable part phase shift, which total variable part phase shift for each path is the sum of at least three respective variable part phase shifts, wherein each respective variable part phase shift for each modulation state assumes one of two respective predetermined values, and wherein each symbol in the said set of symbols is modulated using a respective combination of two such total variable part phase shifts, characterized in that the modulation performed by the two paths is a PSK (Phase Shift Keying) modulation scheme, in that the said group of symbols comprises $2^N$ unique symbols, in that the light led through each respective path is phase shifted using $2^N-1$ variable part phase shifts, and in that the respective difference between the respective predetermined values is the same for all variable part phase shifts.

The invention also relates to a device for performing such modulation of a carrier wave.

BRIEF DESCRIPTION OF THE DRAWINGS

In the following, the invention will be described in detail, with reference to the appended drawings, in which.

DETAILED DESCRIPTION OF THE INVENTION

For all figures, the same or corresponding parts share the same reference numerals.

Using optical communication technology, it is possible to send information using both amplitude and phase modulation schemes.

Figure 2:
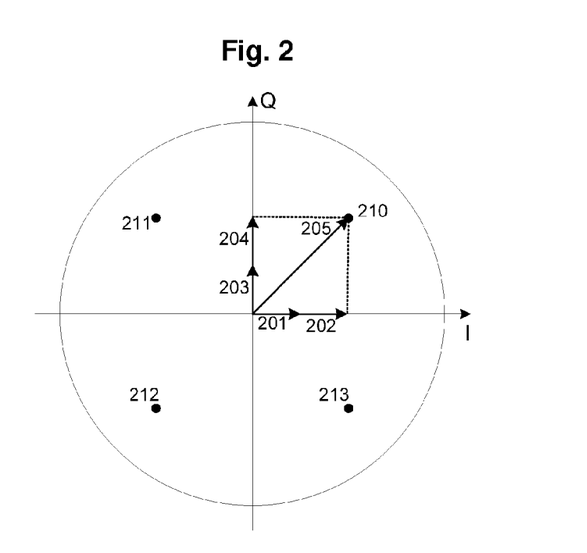
FIG. 2 shows a phasor or constellation diagram of a conventional modulating device.

One example of a conventional advanced modulation format is the Quadrature Phase Shift Keying (QPSK) scheme, involving four distinct symbols 210, 211, 212, 213 as shown in FIG. 2 in a phasor diagram. The circle illustrates the unity amplitude transmission.

Figure 1:
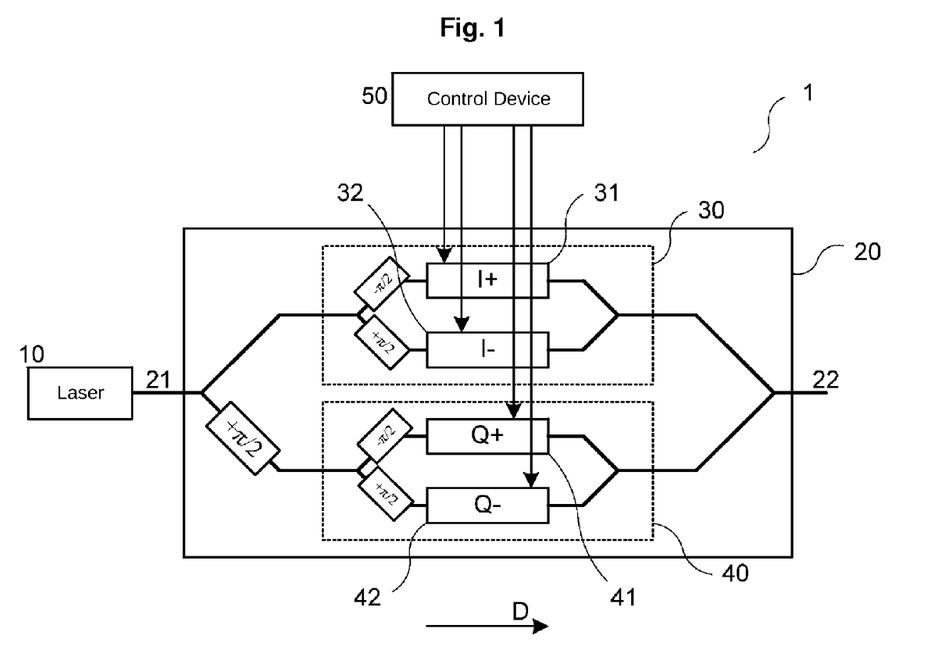
FIG. 1 shows a conventional modulating device.

FIG. 1 illustrates a so called IQ modulator 1 of conventional type, which is capable of QPSK modulating a carrier light wave 21 incident from a light source, such as a semiconductor laser 10, and to achieve a modulated light wave 22 that can be transmitted to a receiver (not shown) for demodulation and interpretation. D is the light travel direction.

The modulator 1 comprises a main or parent Mach-Zehnder Interferometer (MZI) 20, the respective paths of which comprises one respective child MZI 30, 40 each. The child MZIs 30, 40 are parallel-coupled, where the child MZI 30 comprises first and second paths of the modulator 1 and the child MZI 40 comprises third and fourth paths of the modulator 1.

Each child MZI is set up as if it were used for so-called Binary Phase Shift Keying (BPSK), which is a conventional modulation technique using two symbols. Taking, for instance, the child MZI 30, there is a static phase shift of $$\pm \frac{\pi}{2}$$

radians, implemented using a separate respective electrode, on each respective arm, which is combined with a respective variable phase shift, across electrodes marked with I+ and I−, respectively, in FIG. 1. The variable phase shift is performed using an electrode 31, 32 on the respective child MZI 30 arm, which is arranged to modify the refractive index of the light carrying material in the waveguide in question. In the exemplifying case, this is achieved by applying the said electric signal onto the respective electrode 31, 32, 41, 42 on the waveguide by a control device or drive unit 50 in order to achieve the corresponding modulating phase shift.

The control device 50 is in turn fed with a data signal from a data source (not shown), and arranged to pairwise, in a push-pull fashion, phase shift the light wave traveling through the two child MZI 30 arms by $$+\frac{\pi}{2}$$

radians and $$-\frac{\pi}{2}$$

radians (I+ and I−, or I− and I+, depending on symbol), respectively. Such modulation results in that the light that has traveled through the child MZI 30 will assume one of two possible symbols, in which the complex light E-field has a value of either +1 or −1, on the real I-axis in a phasor diagram such as the one illustrated in FIG. 2.

That the control is "push-pull" means that the control device 50 controls the phase shift for light traveling through the two arms of the child MZI 30 to be equal but of opposite sign. For instance, if the electrodes 31, 32 are identical, the control device 50 can apply an equal voltage, but with opposite sign, to each of the two electrodes 31, 32. This is beneficial in many cases, since the control device 50 may apply a completely or partly anti-symmetric noise to the electrodes, in turn cancelling out a larger part of the existing voltage noise and decreasing the optical phase noise.

The same can be said regarding child MZI 40, with the only difference that the parent MZI 20 arm leading up to the child MZI 40 has a static phase shift of an additional $$+\frac{\pi}{2}$$

radians as compared to child MZI 30, implemented using a separate electrode.

However, in contrast to BPSK modulation, in the case of QPSK modulation the four symbols 210-213 differ in both the real part (the I-axis) and the imaginary part (the Q-axis) of the complex E-field, as illustrated in FIG. 2.

Hence, for the IQ modulator illustrated in FIG. 1, one of the child MZIs 40 has the mentioned initial static phase shift of $$+\frac{\pi}{2}$$

radians, which is applied before the light enters the child MZI 40. With such a setup, the child MZI 30 will be effective for modulating the real part of the E-field (I-axis in the phasor diagram of FIG. 2), and the child MZI 40 will be effective for modulating the imaginary part of the E-field (Q-axis). By applying respective electrical signals onto electrodes 31, 32; 41, 42 in a push-pull fashion, an I-data stream represented in the modulated light wave 22 by the electrical signal applied over time onto electrodes 31 and 32 of child MZI 30 can be represented as variations of the real part of the E-field of the modulated light wave, and correspondingly a Q-data stream represented by the electrical signal applied over time onto electrodes 41, 42 of child MZI 40 can be represented in the modulated light wave 22 as variations of the corresponding imaginary part of the E-field. In QPSK, this can be done in a straightforward way by sending, in the form of corresponding electrical signals, the I-data stream to the I-child 30 and the Q-data stream to the Q-child 40.

The result is illustrated in FIG. 2, where the vectors 201, 202, 203 and 204 correspond to the light that has traveled through paths I+, I−, Q+ and Q−, respectively, and for a certain symbol where I+=1, I−=−1, Q+=1 and Q−=−1, so that the variable phase modulation applied by the respective electrodes 31, 32, 41, 42 is $$+\frac{\pi}{2}, -\frac{\pi}{2}, +\frac{\pi}{2} \text{ and } -\frac{\pi}{2},$$

respectively. Hence, the total phase shift, including the static modulation, for each path is according to Table I for this particular symbol:

TABLE I

| Vector | Data | Total phase shift |
|---|---|---|
| 201 | I+ = 1 | $\left(-\frac{\pi}{2}\right) + \frac{\pi}{2} = 0$ |
| 202 | I− = −1 | $\frac{\pi}{2} + \left(-\frac{\pi}{2}\right) = 0$ |
| 203 | Q+ = 1 | $\frac{\pi}{2} + \left(-\frac{\pi}{2}\right) + \frac{\pi}{2} = \frac{\pi}{2}$ |
| 204 | Q− = −1 | $\frac{\pi}{2} + \frac{\pi}{2} + \left(-\frac{\pi}{2}\right) = \frac{\pi}{2}$ |

The resulting vector 205 represents the output light wave 22 after final combination of the light waves output by the two child MZIs 30, 40.

If one neglects imperfections and absorption, each child MZI 30, 40 has a theoretical normalized optical transmission amplitude of 1, since at each symbol the two paths add up perfectly in phase. However, since the paths of the two child MZIs 30, 40 are $$\frac{\pi}{2}$$

radians out of phase with respect to each other at all symbols when using QPSK, their maximum normalized transmission amplitude, i.e. the length of vector 205, is only $$\sqrt{\frac{1}{2}}.$$

Higher transmission amplitudes are desirable, since they mean that a weaker input signal would be required for the same output signal transmission amplitude. Also, a stronger output signal to an output optical fiber is desirable, since it means that the signal can travel a longer distance before requiring amplification.

Figure 3A:
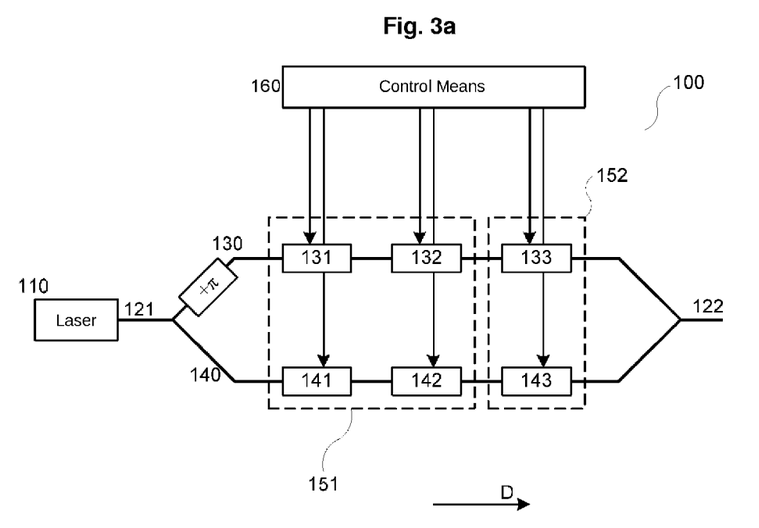
FIGS. 3a and 3b show a modulating device according to a first and second embodiment of the invention, respectively.
Figure 3B:
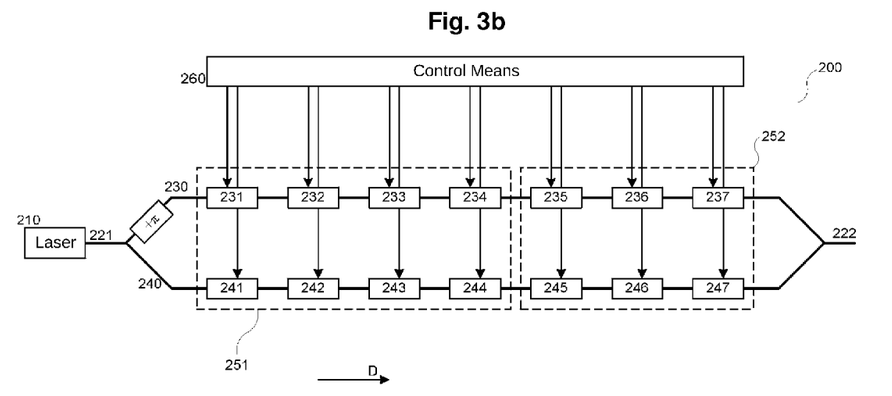

FIGS. 3a and 3b illustrate two respective examples of a light wave modulating device 100, 200 according to the present invention, for modulating an incident carrier light wave 121, 221 so that a modulated light wave 122, 222 is achieved. The carrier light wave 121, 221 is sent out from a light source, such as a semiconductor laser 110, 120. The modulated light wave carries information by means of symbols selected from a set of at least two different symbols.

The device 100, 200 comprises a modulating interferometer through which the carrier light wave is led. The interferometer comprises respective first 130, 230 and second 140, 240 parallel-coupled waveguiding modulation paths, and the carrier light wave is first split, subsequently led through said two paths 130, 140; 230, 240 and then recombined. In the exemplifying embodiments shown in FIGS. 3a and 3b, the respective interferometer is an MZM, the arms of which 130, 140; 230, 240 constitute the said paths.

Each path comprises a respective set of variable phase shifting means 131-133, 231-237; and 141-143, 241-247, respectively. Each such variable phase shifting means is arranged to phase shift the light led through the respective path for modulating each respective symbol in said set of symbols. Since each set of variable phase shifting means 131-133, 141-143, 231-237, 241-247 is series-coupled along the respective path, the respective light led through each respective path, between the said split and the said recombining, is phase shifted by a respective total path phase shift, which total path phase shift for each path is the sum of the said variable part phase shifts for the path in question. For example, in FIG. 3a, the total phase shift of arm 130 is the sum of the serially coupled variable part phase shifts imparted by phase shifting devices 131-133.

According to the invention, there are at least three such variable part phase shifting means for each path, and there are preferably as many variable part phase shifting means serially-coupled along each of the two paths 130, 140; 230, 240.

For each modulation state, in other words for each symbol which is instantaneously being modulated by the device 100, 200, the individual variable part phase shifting means are arranged to impart a respective variable part phase shift which can assume one of two respective predetermined values. In other words, each variable part phase shifting means 131-133, 141-143, 231-237, 241-247 can impart a relative phase shift the light led through the respective means by one of two possible phase shifting values, and they are individually controllable to selectively impart either one of these two phase shifts at any one point in time. The control of the individual variable part phase shifting means is carried out via a control means 160, 260, which is connected to the variable part phase shifting means via electrical conduits, and which is arranged to receive a data stream to be modulated from a data source (not shown).

Hence, the light led through each path 130, 140; 230, 240 is phase modulated by a respective total phase shifting amount along each path 130, 140. Each symbol in the said set of symbols is modulated using a respective combination of two such total variable part phase shift amounts. Preferably, each symbol is defined by a unique respective combination of two such total variable part phase shift amounts.

According to the invention, the modulation performed by the two paths is a PSK (Phase Shift Keying) modulation scheme, in which the modulated light wave 122, 222 and the carrier light wave 121, 221 essentially only differs as regards their phase, and not amplitude or frequency. There can of course be attenuation effects, but preferably there is essentially no negative interference between the two paths 130, 140; 230, 240.

Figure 4A:
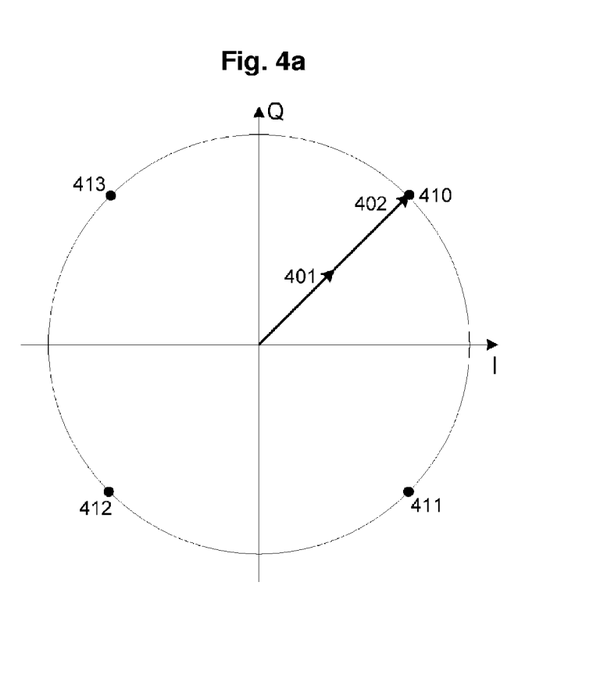
FIGS. 4a and 4b show respective phasor diagrams for the devices of FIGS. 3a and 3b.
Figure 4B:
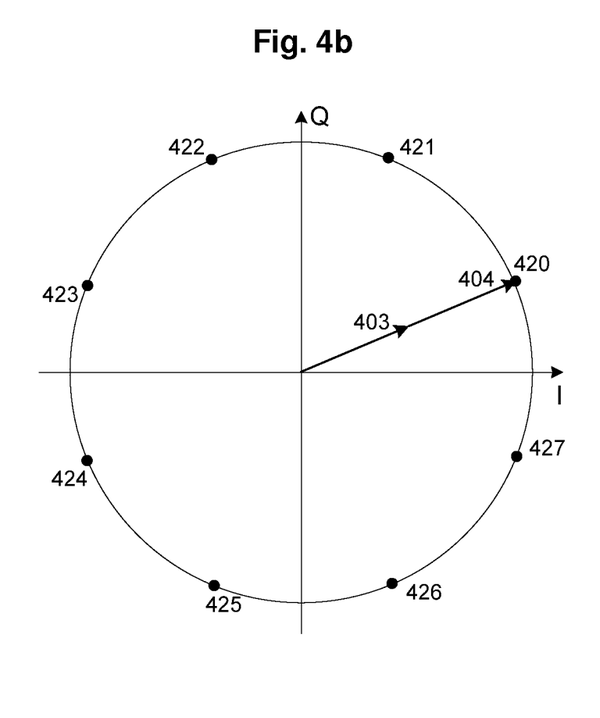

Preferably, the said symbols are uniformly and symmetrically distributed along a circle as seen in a phasor diagram (see FIGS. 4a and 4b). It is realized, however, that the device 100, 200 may be a part of a more complex modulation device, in which the PSK modulation may be a sub modulation in a larger modulation scheme in order to achieve a finally modulated output signal to implement a different modulation scheme.

Furthermore according to the invention, the said group of symbols comprises $2^N$ unique symbols, where N is the maximum number of individually settable information bits which can be encoded in the output signal 122, 222 for each symbol, and the light led through each respective path is phase shifted using $2^N-1$ variable part phase shifts. Hence, in FIG. 3a, N=2 and each symbol can encode two individual bits. Therefore, there can be four distinct symbols, such as when using QPSK modulation. Hence, there are $2^2-1=3$ variable phase shifting means 131, 132, 133; 141, 142, 143 on each path 130, 140. In FIG. 3b, N=3; and there are eight different symbols each coding three bits and $2^3-1=7$ variable phase shifting means 231-237, 241-247 on each path 230, 240.

Finally, according to the invention the respective difference between the respective mentioned predetermined values is the same for all variable part phase shifts. In other words, the difference between the two phase shift values that each respective variable phase shifting means is arranged to impart on the passing light is equally large for all variable phase shifting means.

Using such a general method and such a device, it is possible to achieve various PSK modulation schemes using only a two-armed interferometer. This is preferred since less on-chip space and less DC contacts are then required as compared to a conventional multiple IQ modulator approach, such as for example higher-order PSK formats. Furthermore, such a method leads to only a minimum of disturbance in the output light wave 122, 222 due to input voltage noise to the control means 160, 260, since many of the variable part phase shifting means can be operated pairwise between the two paths 130, 140; 230, 240 in a push-pull fashion. Also, the method only involves binary states for each individual variable part phase shifting means, which results in uncomplicated driver logic in the control means 160, 260. Finally, the method provides an output light wave 122, 222 the transmission power of which can be maximized since the phase of the combined light waves can be arranged to be equal. All of these advantages will be better understood from the following descriptions of the respective modulation schemes for the devices 100, 200 of FIGS. 3a and 3b, respectively.

In the following, it is assumed, as is preferred, that the carrier light wave 121, 221 is split in two equal halves, each being led into one path 130, 140; 230, 240 each. It is also assumed, as is also preferred, that the two paths 130, 140; 230, 240 are associated with a static phase shift offsetting the phase of the two paths compared to each other when combined. In FIGS. 3a and 3b, the static phase shift is in the form of a radians phase shift applied at the beginning of the first path 130; 230. However, it is realized that such static phase shift can be applied at any point along each respective path 130, 140; 230, 240, and also in the form of for instance a $$\frac{\pi}{2}$$

radians phase shift along one path and $$-\frac{\pi}{2}$$

radians phase shift along the other arm. Hence, it is preferred that the said static phase shift offsets the phase of the two paths 130, 140; 230, 240 compared to each other when combined by offsetting the relative phase of the two paths as compared to each other when combined by $\pm\pi$ radians. The static phase shift is imparted to the light travelling through one or both of the two paths using a static phase shifting means which is conventional as such, and which may for instance be in the form of a biased electrode on the waveguide, as shown in the figures.

Table II lists the variable part phase values for device 100 for all four symbols 410, 411, 412, 413. In FIG. 4a, a phasor diagram is shown for these symbols, together with the two light wave vectors 401, 402 as combined after having traversed the paths 130, 140 during modulation of symbol 410.

TABLE II

| Symbol | Variable part phase shifts | | | | | | Total variable phase shifts | |
|---|---|---|---|---|---|---|---|---|
| | 131 | 132 | 133 | 141 | 142 | 143 | 130 | 140 |
| 410 | $-\frac{\pi}{4}$ | $-\frac{\pi}{4}$ | $-\frac{\pi}{4}$ | $\frac{\pi}{4}$ | $\frac{\pi}{4}$ | $-\frac{\pi}{4}$ | $-\frac{3\pi}{4}$ | $\frac{\pi}{4}$ |
| 411 | $\frac{\pi}{4}$ | $\frac{\pi}{4}$ | $\frac{\pi}{4}$ | $-\frac{\pi}{4}$ | $-\frac{\pi}{4}$ | $\frac{\pi}{4}$ | $\frac{3\pi}{4}$ | $-\frac{\pi}{4}$ |
| 412 | $\frac{\pi}{4}$ | $\frac{\pi}{4}$ | $\frac{\pi}{4}$ | $\frac{\pi}{4}$ | $\frac{\pi}{4}$ | $\frac{\pi}{4}$ | $\frac{\pi}{4}$ | $\frac{3\pi}{4}$ |
| 413 | $\frac{\pi}{4}$ | $\frac{\pi}{4}$ | $-\frac{\pi}{4}$ | $-\frac{\pi}{4}$ | $-\frac{\pi}{4}$ | $-\frac{\pi}{4}$ | $\frac{\pi}{4}$ | $-\frac{3\pi}{4}$ |

Hence, the total phase shift, counting both the total variable phase shifts and the static phase shift, is according to table III, where it is used that for the present purposes, $2\pi=0$ radians.

TABLE III

| | Total variable phase shift | | Static phase shift | | Total phase shift | |
|---|---|---|---|---|---|---|
| Symbol | 130 | 140 | 130 | 140 | 130 | 140 |
| 410 | $-\frac{3\pi}{4}$ | $\frac{\pi}{4}$ | $\pi$ | 0 | $\frac{\pi}{4}$ | $\frac{\pi}{4}$ |
| 411 | $\frac{3\pi}{4}$ | $-\frac{\pi}{4}$ | $\pi$ | 0 | $-\frac{\pi}{4}$ | $-\frac{\pi}{4}$ |

TABLE III-continued

| | Total variable phase shift | | Static phase shift | | Total phase shift | |
|---|---|---|---|---|---|---|
| Symbol | 130 | 140 | 130 | 140 | 130 | 140 |
| 412 | $-\frac{\pi}{4}$ | $\frac{3\pi}{4}$ | $\pi$ | 0 | $\frac{3\pi}{4}$ | $\frac{3\pi}{4}$ |
| 413 | $\frac{\pi}{4}$ | $-\frac{3\pi}{4}$ | $\pi$ | 0 | $-\frac{3\pi}{4}$ | $-\frac{3\pi}{4}$ |

Table IV corresponds to table II, but for the device shown in FIG. 3b, and for the symbols 420-427 as illustrated in the phasor diagram of FIG. 4b. The two light wave vectors 403, 404 represent the modulation of symbol 420, in a manner corresponding to vectors 401, 402 as shown in FIG. 4a.

TABLE IV

| | Variable part phase shifts, path 230 | | | | | | | Tot. var. ph. shift |
|---|---|---|---|---|---|---|---|---|
| Symbol | 231 | 232 | 233 | 234 | 235 | 236 | 237 | 230 |
| 420 | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $\frac{7\pi}{8}$ |
| 421 | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $-\frac{\pi}{8}$ | $\frac{5\pi}{8}$ |
| 422 | $\frac{\pi}{8}$ | $\frac{\pi}{8}$ | $\frac{\pi}{8}$ | $\frac{\pi}{8}$ | $\frac{\pi}{8}$ | $-\frac{\pi}{8}$ | $-\frac{\pi}{8}$ | $\frac{3\pi}{8}$ |
| 423 | $\frac{\pi}{8}$ | $\frac{\pi}{8}$ | $\frac{\pi}{8}$ | $\frac{\pi}{8}$ | $-\frac{\pi}{8}$ | $-\frac{\pi}{8}$ | $-\frac{\pi}{8}$ | $\frac{\pi}{8}$ |
| 424 | $-\frac{\pi}{8}$ | $-\frac{\pi}{8}$ | $-\frac{\pi}{8}$ | $-\frac{\pi}{8}$ | $\frac{\pi}{8}$ | $\frac{\pi}{8}$ | $\frac{\pi}{8}$ | $-\frac{\pi}{8}$ |
| 425 | $-\frac{\pi}{8}$ | $-\frac{\pi}{8}$ | $-\frac{\pi}{8}$ | $-\frac{\pi}{8}$ | $\frac{\pi}{8}$ | $\frac{\pi}{8}$ | $-\frac{\pi}{8}$ | $-\frac{3\pi}{8}$ |
| 426 | $-\frac{\pi}{8}$ | $-\frac{\pi}{8}$ | $-\frac{\pi}{8}$ | $-\frac{\pi}{8}$ | $\frac{\pi}{8}$ | $-\frac{\pi}{8}$ | $-\frac{\pi}{8}$ | $-\frac{5\pi}{8}$ |
| 427 | $-\frac{\pi}{8}$ | $-\frac{\pi}{8}$ | $-\frac{\pi}{8}$ | $-\frac{\pi}{8}$ | $-\frac{\pi}{8}$ | $-\frac{\pi}{8}$ | $-\frac{\pi}{8}$ | $\frac{7\pi}{8}$ |

| | Variable part phase shifts, path 240 | | | | | | | Tot. var. ph. shift |
|---|---|---|---|---|---|---|---|---|
| Symbol | 241 | 242 | 243 | 244 | 245 | 246 | 247 | 240 |
| 420 | $-\frac{\pi}{8}$ | $-\frac{\pi}{8}$ | $-\frac{\pi}{8}$ | $-\frac{\pi}{8}$ | $\frac{\pi}{8}$ | $\frac{\pi}{8}$ | $\frac{\pi}{8}$ | $-\frac{\pi}{8}$ |
| 421 | $-\frac{\pi}{8}$ | $-\frac{\pi}{8}$ | $-\frac{\pi}{8}$ | $-\frac{\pi}{8}$ | $\frac{\pi}{8}$ | $\frac{\pi}{8}$ | $-\frac{\pi}{8}$ | $-\frac{3\pi}{8}$ |
| 422 | $-\frac{\pi}{8}$ | $-\frac{\pi}{8}$ | $-\frac{\pi}{8}$ | $-\frac{\pi}{8}$ | $\frac{\pi}{8}$ | $-\frac{\pi}{8}$ | $-\frac{\pi}{8}$ | $-\frac{5\pi}{8}$ |
| 423 | $-\frac{\pi}{8}$ | $-\frac{\pi}{8}$ | $-\frac{\pi}{8}$ | $-\frac{\pi}{8}$ | $-\frac{\pi}{8}$ | $-\frac{\pi}{8}$ | $-\frac{\pi}{8}$ | $-\frac{7\pi}{8}$ |
| 424 | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $\frac{7\pi}{8}$ |
| 425 | $\frac{\pi}{8}$ | $\frac{\pi}{8}$ | $\frac{\pi}{8}$ | $\frac{\pi}{8}$ | $\frac{\pi}{8}$ | $\frac{\pi}{8}$ | $-\frac{\pi}{8}$ | $\frac{5\pi}{8}$ |

TABLE IV-continued

| 426 | $\frac{\pi}{8}$ | $\frac{\pi}{8}$ | $\frac{\pi}{8}$ | $\frac{\pi}{8}$ | $\frac{\pi}{8}$ | $-\frac{\pi}{8}$ | $-\frac{\pi}{8}$ | $\frac{3\pi}{8}$ |
| --- | --- | --- | --- | --- | --- | --- | --- | --- |
| 427 | $\frac{\pi}{8}$ | $\frac{\pi}{8}$ | $\frac{\pi}{8}$ | $\frac{\pi}{8}$ | $\frac{\pi}{-8}$ | $-\frac{\pi}{8}$ | $-\frac{\pi}{8}$ | $\frac{\pi}{8}$ |

Table V corresponds to table III, but for the symbols of FIG. 4b.

TABLE V

| Symbol | Total variable phase shift | | Static phase shift | | Total phase shift | |
| --- | --- | --- | --- | --- | --- | --- |
| | 230 | 240 | 230 | 240 | 230 | 240 |
| 420 | $\frac{7\pi}{8}$ | $-\frac{\pi}{8}$ | $\pi$ | 0 | $-\frac{\pi}{8}$ | $-\frac{\pi}{8}$ |
| 421 | $\frac{5\pi}{8}$ | $-\frac{3\pi}{8}$ | $\pi$ | 0 | $-\frac{3\pi}{8}$ | $-\frac{3\pi}{8}$ |
| 422 | $\frac{3\pi}{8}$ | $-\frac{5\pi}{8}$ | $\pi$ | 0 | $-\frac{5\pi}{8}$ | $-\frac{5\pi}{8}$ |
| 423 | $\frac{\pi}{8}$ | $-\frac{7\pi}{8}$ | $\pi$ | 0 | $-\frac{7\pi}{8}$ | $-\frac{7\pi}{8}$ |
| 420 | $-\frac{\pi}{8}$ | $\frac{7\pi}{8}$ | $\pi$ | 0 | $\frac{7\pi}{8}$ | $\frac{7\pi}{8}$ |
| 421 | $-\frac{3\pi}{8}$ | $\frac{5\pi}{8}$ | $\pi$ | 0 | $\frac{5\pi}{8}$ | $\frac{5\pi}{8}$ |
| 422 | $-\frac{5\pi}{8}$ | $\frac{3\pi}{8}$ | $\pi$ | 0 | $\frac{3\pi}{8}$ | $\frac{3\pi}{8}$ |
| 423 | $-\frac{7\pi}{8}$ | $\frac{\pi}{8}$ | $\pi$ | 0 | $\frac{\pi}{8}$ | $\frac{\pi}{8}$ |

From tables II-V, it is clear that, for each variable part phase shift, the above mentioned predetermined values are equal but of opposite sign. Namely, all variable part phase shifts of FIG. 3a are $$\pm \frac{\pi}{4},$$

and all variable part phase shifts of FIG. 3b are $$\pm \frac{\pi}{8}.$$

More generally, it is preferred that all predetermined variable part phase shift values are $$\pm \frac{\pi}{2^N}.$$

Such a configuration makes it possible to pairwise apply a control electrical signal to phase shifting electrodes between the two paths 130, 140; 230, 240 in a push-pull fashion, which is preferred for at least one such pair of variable part phase shifting means.

More generally, the variable part phase shifting means of both paths are divided into two groups—a first group of variable part phase shifting means and a second group of variable part phasing means. For both paths, the first group contains the same number of variable part phase shifting means, and the second group contains the same number of variable part phase shifting means. It is preferred that all variable part phase shifting means belong to either the first or the second group.

In FIG. 3a, the first group 151 contains means 131, 132, 141, 142, and the second group 152 contains means 133, 143. In FIG. 3b, the first group 251 contains means 231, 232, 233, 234, 241, 242, 243, 244, and the second group 252 contains means 235, 236, 237, 245, 246, 247. More generally, the first group comprises $2^{N-1}$ of the variable part phase shifting means, and the second group, comprises the remaining $2^{N-1}-1$ variable part phase shifting means. Furthermore, the respective individual variable part phase shifting means of the respective first group of the first path are pairwise mapped to corresponding individual variable part phase shifting means of the respective first group of the second path, so that the variable part phase shifts imparted by each such pair, for at all symbols, are equally large but of opposite sign. Hence, these paired individual variable part phase shifting means are controlled by control means 160, 260 in a push-pull fashion.

From tables II-V it is also clear that, for all symbols in the present exemplifying embodiments, all the variable part phase shifts along one respective path in the first group are equal. Preferably, and as shown in tables II-V, the total variable phase shift of the variable part phase shifting means along each respective path and comprised in the first group is $$\pm \frac{\pi}{2}$$

radians for all symbols.

Furthermore, it is preferred that, for all symbols, the total variable part phase shift from all variable part phase shifting means of the first path 130, 230 and comprised in the first group 151, 251 is the same as the total variable part phase shift from all variable part phase shifting means of the second path 140, 240 and comprised in the first group 151, 251, but of opposite sign. This makes it possible to drive the entire first group of variable part phase shifting means in a push-pull fashion, using the same control means 160, 260.

In contrast to the first group, the second group comprises variable part phase shifting means the total variable phase shift of which for each path do not add up to the same value for each symbol. However, and as clear from tables II-V, it is preferred that the variable part phase shifting means are paired two and two with one such means from the first path and the second such means from the second path, and that the respective means of each such pair of variable part phase shifting means, for each symbol in said set of symbols, achieves the same variable part phase shift. This makes it possible to control these second group variable part phase shifting means by the control means 160, 260 and using simplified logic wherein the same control electrical signal is always fed to both means in each such pair.

As is also clear from tables III-V, it is preferred that, for each symbol, the light led through each respective path 130, 140; 230, 240, when combined, are in phase. This achieves maximum transmission amplitude.

The above described methodology is well-suited to achieve a modulation scheme whose symbols are equidistantly positioned along a circle in a phasor diagram, the center of which circle is located at the origin of the phasor diagram. This is illustrated both in FIG. 4a and in FIG. 4b, and is preferred.

It is possible to generalize the above-described four- and eight symbol embodiments further, to sixteen symbols and further, using the same general setup.

Hence, with a modulation method and a device according to the present invention, it is possible to achieve full QPSK modulation of a carrier light wave using only two interferometer arms and very simple driving logic. Since a majority of the variable part phase shifting means can be driven in a push-pull fashion cancelling out any voltage supply noise, only a minority of such voltage noise will be transferred to the output light wave.

As described in connection to the conventional IQ modulator shown in FIG. 1, it is preferred that the variable part phase shifting means 131-133, 141-143; 231-237, 241-247 are in the form of electrodes arranged to modify the refractive index of the waveguide along which the light travels in each respective path 130, 140; 230, 240. Thus, each of the variable part phase shifts is achieved by a respective electrode, to which the control device 160, 260 is arranged to apply a respective electrical signal in order to achieve the corresponding modulating variable part phase shift across each electrode on each path.

Preferably, the variable part phase shifting means are in the form of identical electrodes, or at least electrodes of equal length. This leads to simplified driver electronics.

An additional advantage achieved by the present invention is that the segmentation of electrodes allows for low capacitance segments, and hence better performance under high baud rates, such as at least 25 GHz baud rate.

It is preferred that the light source 110, 210 is a semiconductor laser which is arranged as an integrated part of an optical circuit, manufactured from the same material system as the laser, which further comprises the waveguiding paths 130, 140; 230, 240. In particular, it is preferred that the material system comprises or is constituted by a direct bandgap III-V material systems such indium phosphide or gallium arsenide.

It is also preferred that the waveguiding material along each path 130, 140; 230, 240, preferably also the semiconductor laser 110, 210, is made from another material system than, the control device 160, 260, forming a hybrid integrated circuit. Alternatively, they are made from the same material system but still hybrid integrated. It is particularly preferred that the waveguides 130, 140; 230, 240, and preferably also the laser 110, 210, are made from a material system comprising or being constituted by a direct bandgap III-V material system such as indium phosphide or gallium arsenide, and that the control device 160, 260 is manufactured from silicon.

Namely, in case the waveguides and the control device are made from different material systems, it is advantageous to make the necessary connecting conduits as short as possible to reduce electrical parasitic. The configuration described herein, with two interferometer arms of equal length along which an equal number of equally large electrodes are located, only requires very short connecting conduits since the control device 160, 260 can be positioned very close to the electrodes.

Figure 3C:
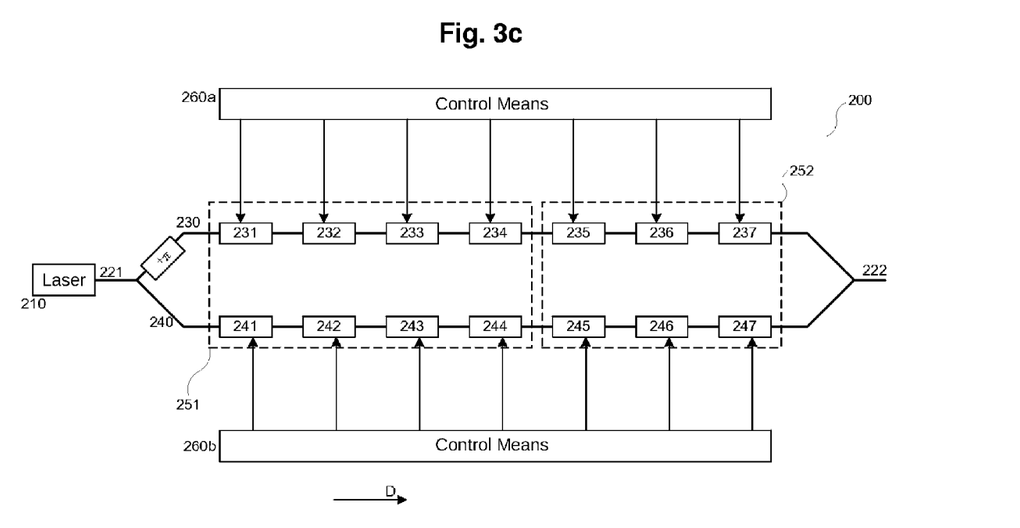
FIG. 3c shows a variant of the modulating device of FIG. 3b.

FIG. 3c is identical to FIG. 3b, but with the difference that the control means in FIG. 3c has been split into two parallel driver parts 260a, 260a, each controlling the variable part phase shift means of one respective path 230, 240. Thus, in this case there can be a separate driver on each side of the chip, keeping the bondwires the same length, in turn minimizing negative inductance effects.

Figure 5:
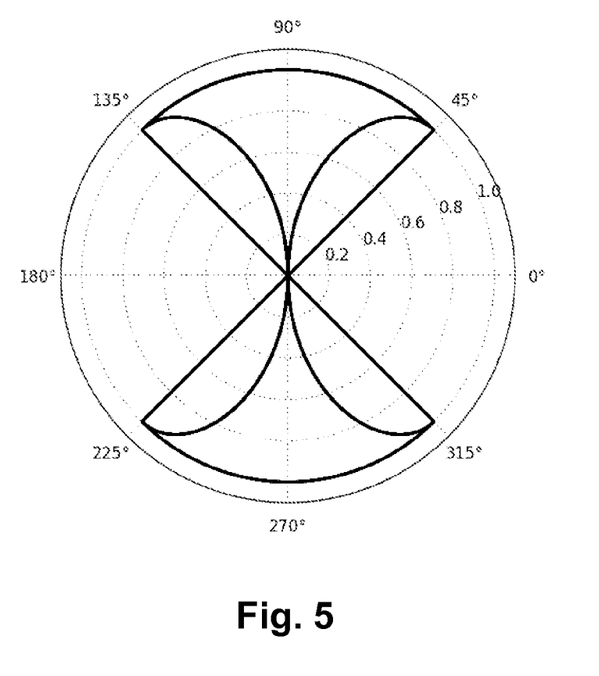
FIG. 5 shows transitions between different symbols in a 4-QAM modulation scheme according to the present invention.

FIG. 5 shows the transitions between the various states in a 4-QAM modulation according to the invention.

FIGS. 6a-6d show the power fluctuations in transitions between states in a modulation scheme according to the present invention, and the corresponding eye diagram properties.

Figure 6A:
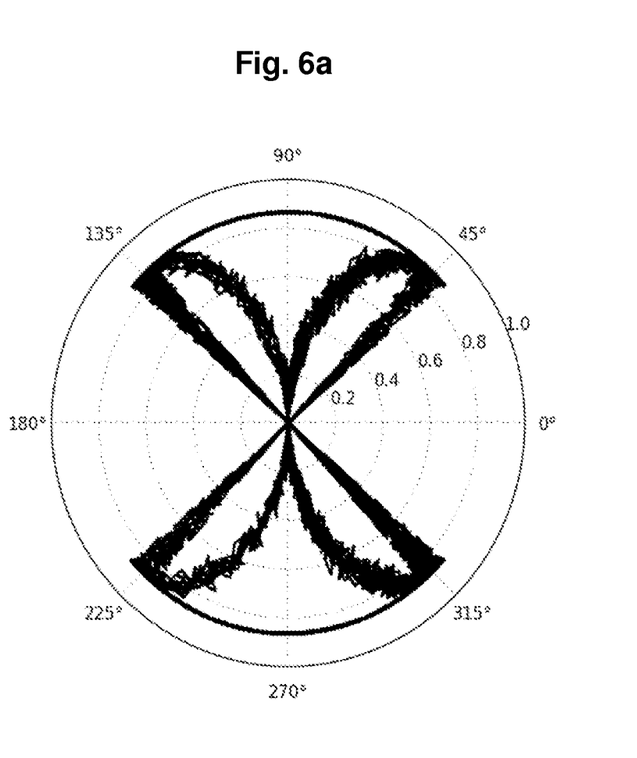
FIGS. 6a-6d show power fluctuations in transitions between different symbols in the 4-QAM modulation scheme of FIG. 5.
Figure 6B:
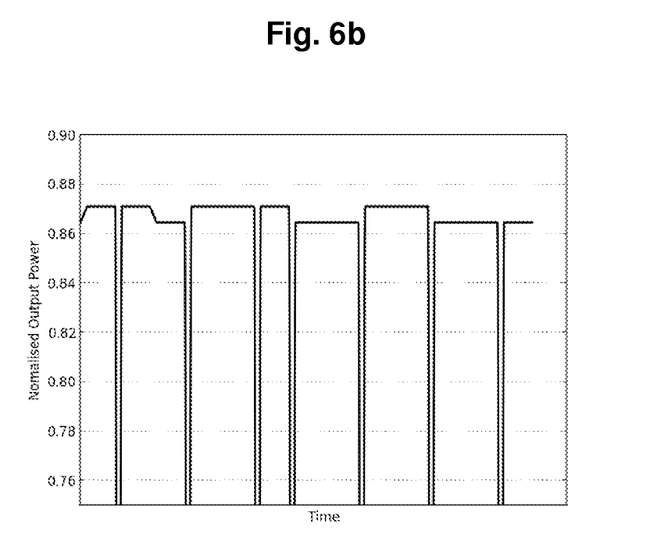

FIG. 6a shows the transition between states with a Signal to Noise Ratio (SNR) of 10. The transitions that follow the circumference of the "circle" have low noise transitions, as they are the result of the low noise section of the device, i.e. the push-pulled electrodes. The other transitions involve a change in the other, more noisy sections. Even without any voltage noise, there is still going to be some fluctuation in output power due to attenuation as a result of applied bias voltage. This can be seen in FIG. 6b. It can also be seen that there is a dip in the output power between many of the states. This is due to the transition through the null in some of the transitions.

Figure 6C:
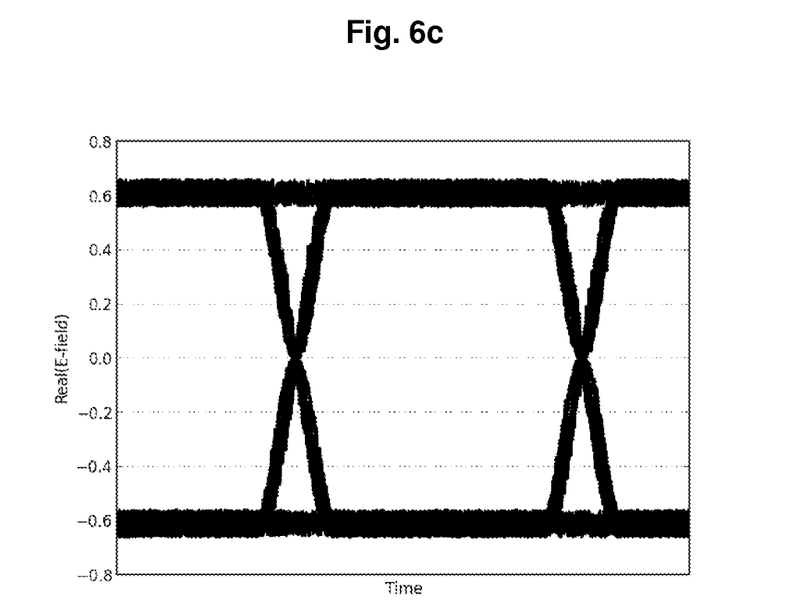
Figure 6D:
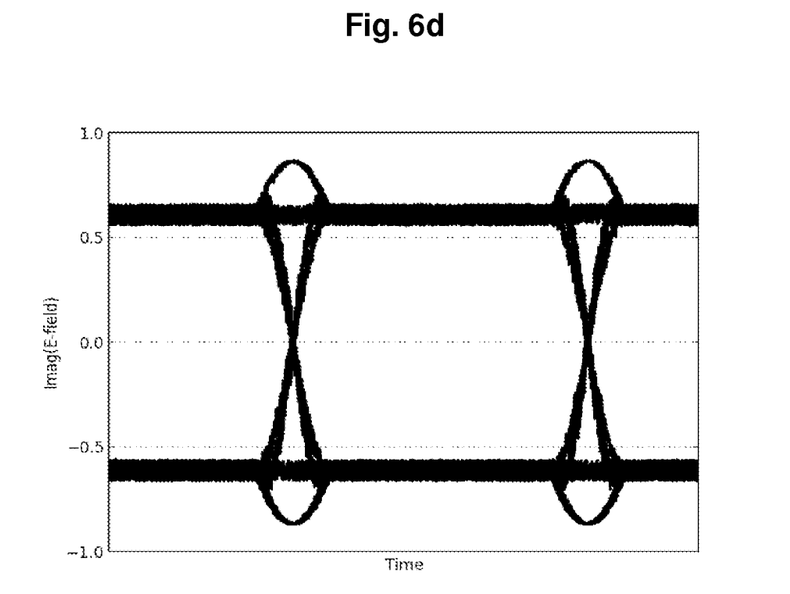
Figure 7:
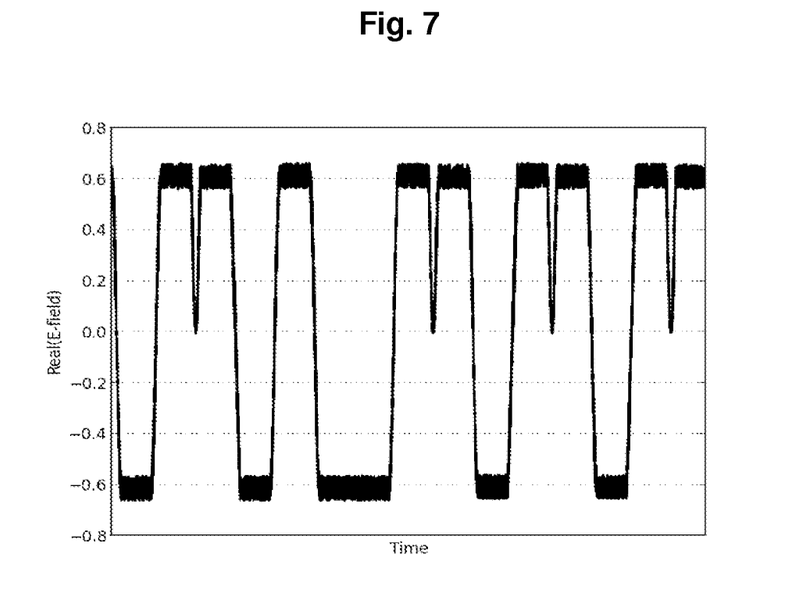
FIG. 7 shows the real part of the E-field as a function of time for the 4-QAM modulation scheme of FIGS. 5-6d.

FIGS. 6c and 6d show how this translates into the optical eye for the I and Q states. The Q eye-diagram has the most noticeable change with power spikes between the transitions that follow the circumference in FIG. 6a. FIG. 6c looks like a standard eye diagram, however there are fluctuations in the amplitude during the transition stages whether there is a transition or not. This is a result of the curved transition when the Q state changes but the I state stays constant. This can be seen in FIG. 7, where there are small dips back to zero. Such constellations transitions would be useful when the PSK modulation scheme is used in conjunction with Return to Zero (RZ) encoding, where the amplitude is amplitude modulated between each bit. The amplitude modulation can be performed by means of another integrated modulator integrated on chip or implemented externally.

FIGS. 8a-8d correspond to FIGS. 6a-6d, but for an 8-PSK modulation scheme according to the invention.

Figure 8A:
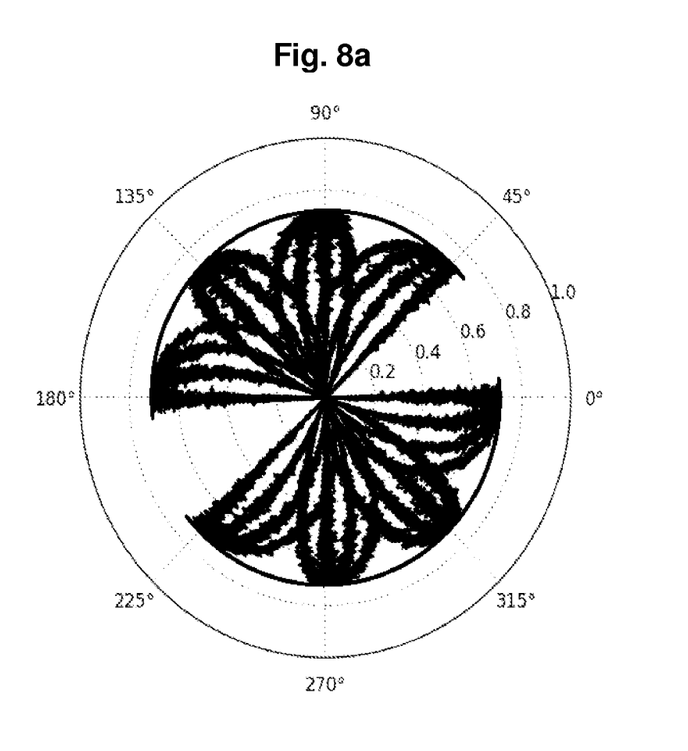
FIGS. 8a-8d show power fluctuations in transitions between different symbols in an 8-PSK modulation scheme according to the present invention.
Figure 8B:
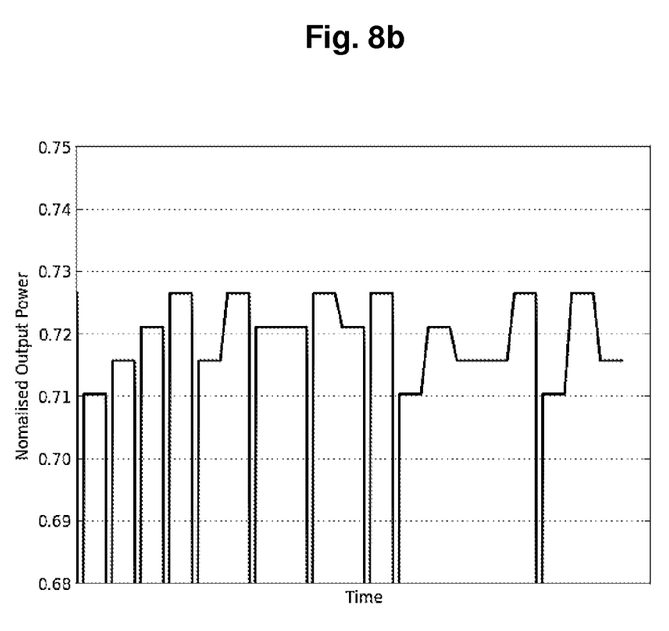
Figure 8C:
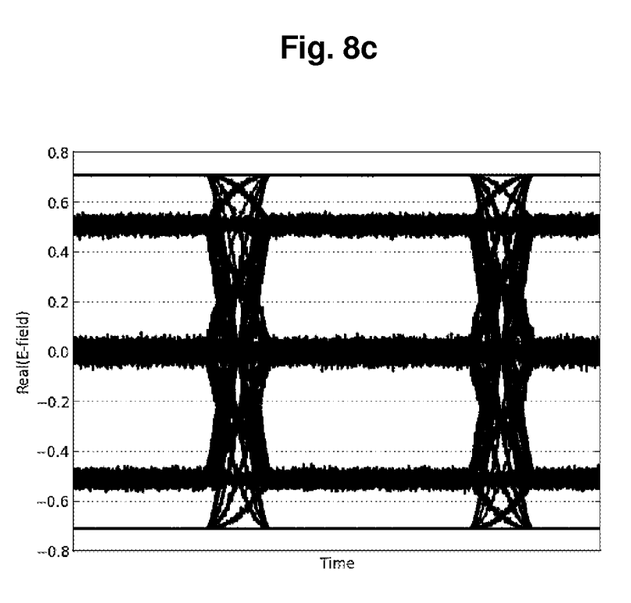
Figure 8D:
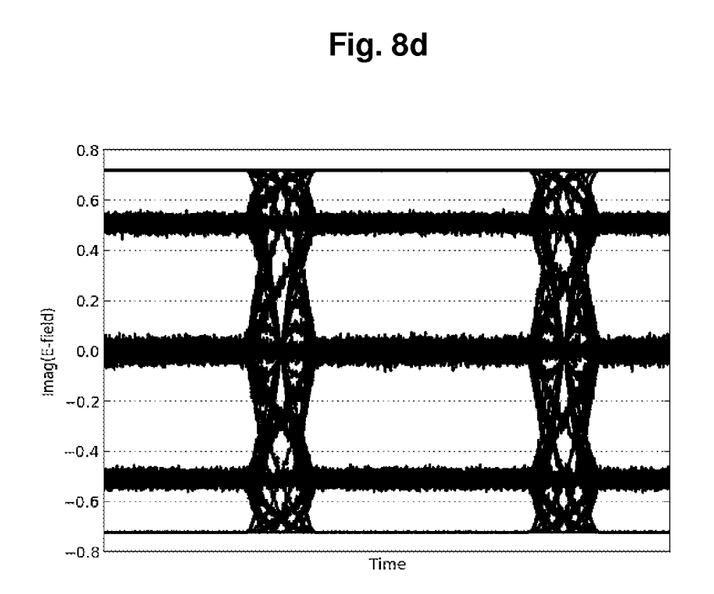

The transition between the states is shown in FIG. 8a. Like the 4-QAM type plot in FIG. 6a, there is a region that the transitions do not pass through when the transition involved going through the upper and lower hemisphere. There is a slightly larger variation in the power in this case, due to the extra number of sections required to generate the signal. This means that there are more variations in the attenuation over the length of the modulator. The generated eye-diagram depends very much on the demodulation scheme, but in this instance the real and imaginary values are taken in FIG. 8c and FIG. 8d to generate a 5 level ASK pattern.

The reason for the low amplitude noise in the transitions on the circumference of the circle is due to the fact that it represents a single phase section without any interference and results in a simple rotation about the circle. The noise in this transition can be seen in the overshooting of the phase.

Above, a number of exemplifying embodiments have been described. However, it is realized that many modifications can be made to these embodiments without departing from the basic idea of the invention.

Hence, it is possible to use a device according to the present invention as a sub-component in a modulating device performing a more complex modulation scheme.

For example, N-PSK modulators can be used in combination to form higher bit per symbol modulation formats. Using two 8-PSK modulators, all the states required for 16-Star PSK can be generated if the power in each arm is arranged in a 3:1 ratio. This could be performed using an asymmetric splitting ratio or an integrated optical attenuator. A simpler variation of this approach is to combine an 8-PSK modulator in series with some form of an amplitude modulator. This may take the form of an EAM (Electro-Absorption Modulator) or a compact MZM, where the amplitude needs to be varied by 3 dB. Two parallel 8-PSK modulators can together achieve a lower overall loss when compared to arranging an amplitude modulator in series, since a shorter total length is then required, resulting in lower insertion loss.

Furthermore, using two 4-QAM modulators in tandem with a −6 dB attenuator, 16-QAM can be achieved. An example of this is shown in Sakamoto, Takahide; Chiba, Akito; Kawanishi, Tetsuya, "50-Gb/s 16 QAM by a quad-parallel Mach-Zehnder modulator," Optical Communication—Post-Deadline Papers (published 2008), 2007 33rd European Conference and Exhibition of Optical Communication (ECOC), 16-20 Sep. 2007.

Also, the variable part phase shifting means may not be in the form of electrodes, but can use other types of known phase shifting mechanisms.

Moreover, the present invention can be applied to a reflective type modulator, in which the waveguiding input and output are the same, and in which a highly reflecting facet or the like is arranged to reflect the incident light back along the same waveguide along which the light incident to the reflector travels. In this case, individual phase modulating electrodes may be traversed twice by the light travelling through the modulator.

Hence, the present invention is not limited to the described embodiments, but can be varied within the scope of the enclosed claims.

The invention claimed is:

1. A method for modulating a carrier light wave so that a modulated light wave is achieved, the modulated light wave carrying information by means of symbols selected from a set of at least four different symbols, comprising:
   leading the carrier light wave through a modulating interferometer comprising respective first and second parallel-coupled waveguiding modulation paths;
   splitting the carrier light wave, and subsequently leading the split carrier light wave through said two paths, and then recombining the split carrier wave; and
   for modulating each respective symbol, between said splitting and said recombining, phase shifting the respective light led through each respective path by a respective total variable part phase shift, the total variable part phase shift for each path being the sum of at least three respective variable part phase shifts,
   wherein each respective variable part phase shift for each modulation state assumes one of two respective predetermined values,
   wherein each symbol in said set of symbols is modulated using a respective combination of two such total variable part phase shifts,
   wherein the modulation performed by the two paths is a PSK (Phase Shift Keying) scheme,
   wherein said set of symbols comprises $2^N$ unique symbols,
   wherein the light led through each respective path is phase shifted using exactly $2^N-1$ variable part phase shifts,
   wherein the respective difference between the respective predetermined values is the same for all variable part phase shifts,
   wherein the two paths are also associated with a static phase shift offsetting the phase of the two paths compared to each other when recombined, and
   wherein the static phase shift offsets the phase of the two paths when recombined by $\pm\pi$ radians.

2. The method according to claim 1, wherein, for each variable part phase shift, said predetermined values are equal but of opposite sign.

3. The method according to claim 1,
   wherein each respective path comprises a first group of variable part phase shifts, comprising $2^{N-1}$ of the variable part phase shifts along the path in question, and a second group of variable part phase shifts, comprising the remaining $2^{N-1}-1$ variable part phase shifts along the path in question,
   wherein the respective individual variable part phase shifts of the respective first variable part phase shift group of the first path are pairwise mapped to corresponding individual variable part phase shifts of the respective first variable part phase shift group of the second path, and
   wherein for each such pair, the two variable part phase shifts are equally large but of opposite sign for all symbols in said set of symbols.

4. The method according to claim 3, wherein the total variable phase shift of each first group of variable part phase shifts is $$\pm\frac{\pi}{2}$$

radians for all symbols in said set of symbols.

5. The method according to claim 1, wherein the light led through each respective path, when recombined, is in phase for each symbol in said set of symbols.

6. The method according to claim 1, wherein N is 2 and a number of symbols is four, or N is 3 and a number of symbols is eight.

7. The method according to claim 6, wherein, in a phasor diagram, the symbols are equidistantly positioned along a circle, the center of which is located at the origin of the phasor diagram.

8. The method according to claim 1,
   wherein each of said variable part phase shifts is achieved by a respective electrode for modifying the refractive index of the material of the respective path, and
   wherein a control device applies a respective electrical signal to each respective electrode along both paths in order to achieve the corresponding modulating phase shift.

9. The method according to claim 8, wherein the waveguiding material along each path is made from another material system than the control device.

10. A light wave modulating device, comprising:
    a carrier light wave input;
    a modulated light wave output; and
    a modulating interferometer with first and second parallel-coupled waveguiding modulation paths, on which modulated light output the device is arranged to achieve a modulated output wave that carries information by means of symbols selected from a set of at least four different symbols, the device being arranged to first split the incident carrier light wave, subsequently convey the light wave through said two paths and then to recombine the light wave, wherein for modulating each respective symbol the device comprises a control device, arranged to control a respective set of at least three variable part phase shifting means along each of the first and second paths, each of the respective sets of variable part phase shifting means being arranged to phase shift the respective light led through the respective path, between said split and said recombining, by a respective total variable part phase shift, wherein each respective variable part phase shifting means for each modulation state is arranged to impart a variable part phase shift to the light led through the path in question, the part phase shift being capable of assuming one of two respective predetermined values, wherein the device is arranged to modulate each symbol in said set of symbols using a respective combination of two such total variable part phase shifts, wherein the modulation performed by the two paths is a PSK (Phase Shift Keying) modulation scheme, wherein said set of symbols comprises $2^N$ unique symbols, wherein the light led through each respective path is phase shifted using exactly $2^N-1$ variable part phase shifting means, wherein the respective difference between the respective predetermined values is the same for all variable part phase shifting means, wherein the device further comprises a static phase shifting means, arranged to offset the phase of the two paths compared to each other when recombined, and wherein the static phase shifting means is arranged to offset the phase of the two paths when recombined by $\pm\pi$ radians.

11. The device according to claim 10, wherein, for each variable part phase shift, said predetermined values are equal but of opposite sign.

12. The device according to claim 10, wherein each respective path comprises a first group of variable part phase shifting means, comprising $2^{N-1}$ of the variable part phase shifting means along the path in question, and a second group of variable part phase shifting means, comprising the remaining $2^{N-1}-1$ variable part phase shifting means along the path in question, wherein the respective individual variable part phase shifting means of the respective first variable part phase shifting means group of the first path are pairwise mapped to corresponding individual variable part phase shifting means of the respective first variable part phase shifting means group of the second path, and wherein for each such pair, the corresponding two variable part phase shifts are equally large but of opposite sign for all symbols in said set of symbols.

13. The device according to claim 12, wherein the total variable phase shift of each first group of variable part phase shifting means is $$\pm\frac{\pi}{2}$$

radians for all symbols in said set of symbols.

14. The device according to claim 10, wherein the control device is arranged to control the variable part phase shifting means so that the light led through each respective path, when recombined, is in phase for each symbol in said set of symbols.

15. The device according to claim 10, wherein N is 2 and a number of symbols is four, or N is 3 and a number of symbols is eight.

16. The device according to claim 15, wherein, in a phasor diagram, the symbols are equidistantly positioned along a circle, the center of which is located at the origin of the phasor diagram.

17. The device according to claim 10, wherein each of said variable part phase shifting means is in the form of a respective electrode for modifying the refractive index of the material of the respective path, and wherein the control device is arranged to apply a respective electrical signal to each respective electrode along both paths in order to achieve the corresponding modulating phase shift.

18. The device according to claim 17, wherein the waveguiding material along each path is made from another material system than the control device.

* * * * *